United States Patent
Shimojou et al.

(10) Patent No.: US 11,102,827 B2
(45) Date of Patent: Aug. 24, 2021

(54) INFORMATION NOTIFICATION METHOD AND MOBILE COMMUNICATION SYSTEM

(71) Applicant: NTT DOCOMO, INC., Tokyo (JP)

(72) Inventors: Takuya Shimojou, Tokyo (JP); Shigeru Iwashina, Tokyo (JP); Ashiq Khan, Tokyo (JP); Masayoshi Shimizu, Tokyo (JP); Atsushi Minokuchi, Tokyo (JP); Malla Reddy Sama, Munich (DE); Srisakul Thakolsri, Munich (DE); Irfan Ali, Istanbul (TR)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/495,639

(22) PCT Filed: Mar. 9, 2018

(86) PCT No.: PCT/JP2018/009272
§ 371 (c)(1),
(2) Date: Sep. 19, 2019

(87) PCT Pub. No.: WO2018/173808
PCT Pub. Date: Sep. 27, 2018

(65) Prior Publication Data
US 2020/0113001 A1    Apr. 9, 2020

(30) Foreign Application Priority Data
Mar. 22, 2017    (JP) .............................. JP2017-056364

(51) Int. Cl.
*H04W 76/10* (2018.01)
*H04W 68/00* (2009.01)
(Continued)

(52) U.S. Cl.
CPC .......... *H04W 76/10* (2018.02); *H04L 12/4641* (2013.01); *H04W 68/005* (2013.01); *H04W 72/04* (2013.01)

(58) Field of Classification Search
CPC ... H04W 76/10; H04W 68/005; H04W 72/04; H04L 12/4641
See application file for complete search history.

(56) References Cited

U.S. PATENT DOCUMENTS

2017/0070892 A1    3/2017  Song et al.
2017/0303259 A1*  10/2017  Lee .................... H04W 72/048
(Continued)

OTHER PUBLICATIONS

ZTE; "Network Slice Selection Procedure"; 3GPP TSG RAN WG3 Meeting #92, R3-161107; Nanjng, China, May 23-27, 2016 (4 pages).
(Continued)

*Primary Examiner* — Marisol Figueroa
(74) *Attorney, Agent, or Firm* — Osha Bergman Watanabe & Burton LLP (57) ABSTRACT

A mobile communication system is a mobile communication system that controls a connection with a slice which is a virtual network generated on a network infrastructure, and includes a request receiving unit 12 that receives a request for a connection with a slice of a control target of an AMF 100 from a UE 140 used by a user and a selection information transmitting unit 14 that controls, in response to the reception of the request, the connection of the UE 140 with the slice, acquires selection information for selecting a slice of a control target of another AMF 100x different from the AMF 100, and transmits the selection information to the terminal.

6 Claims, 8 Drawing Sheets

(51) Int. Cl.
*H04W 72/04* (2009.01)
*H04L 12/46* (2006.01)

(56) References Cited

U.S. PATENT DOCUMENTS

2018/0199279 A1* 7/2018 Baek .................. H04W 48/18
2018/0199398 A1* 7/2018 Dao .................. H04W 36/0022
2019/0357129 A1* 11/2019 Park .................. H04W 60/00

OTHER PUBLICATIONS

SA2; "Reply LS to LS on state of SA3 discussions on NG security architecture"; SA WG2 Meeting #120, S2-172214; Busan, South Korea; Mar. 27-31, 2017 (3 pages).
Akihiro Nakao, "Virtual Node Project Virtualization Technology for Building New-Generation", National Institute of Information and Communication Technology, Jun. 2010 (12 pages).
International Preliminary Report on Patentability issued in Application No. PCT/JP2018/009272, dated Oct. 3, 2019 (7 pages).
Office Action issued in Russian Application No. 2019121034/07(041151), dated Mar. 16, 2021 (14 pages).
Extended European Search Report in counterpart European Application No. 18771982.8 dated Nov. 30, 2020 (13 pages).
ZTE, Oracle, ETRI, Telecom Italia, KDDI; "Network Slicing Architecture Alignment for the Support of Standalone Network Slice Selection Function (NSSF)"; 3GPP SA WG2 Meeting #119, S2-171027; Dubrovnik, Croatia; Feb. 13-17, 2017 (11 pages).
Nokia et al; "TS 23.501 OI#32: Triggering of NSSP update ENs removal"; 3GPP TSG SA WG2 Meeting #124, S2-178543; Reno, Nevada, USA; Nov. 27-Dec. 1, 2017 (4 pages).
Ericsson; "23.501: Network Slice Selection enhancements"; 3GPP SA WG2 Meeting #120, S2-171784; Busan, Korea; Mar. 27-31, 2017 (6 pages).
Office Action issued in Chinese Application No. 201880015082.3, dated Apr. 2, 2021 (13 pages).
3GPP SA WG2 Meeting #119; S2-170912; "Network Slice Selection Assistance Information;" Ericsson, NTT DOCOMO; Feb. 13-17, 2017; Dubrovnik, Croatia (4 pages).
SA WG2 Meeting #119; S2-171027 "Proposed architecture alignments of Network Slicing Conclusion with 5G Core Overall Architecture in TS 23.501" ZTE, Oracle, ETRI, Telecom Italia, KDDI; Dubrovnik, Croatia; Feb. 13-17, 2017 (9 pages).

\* cited by examiner

| IMSI | S-NSSAI | ISO-S-NSSAI |
|---|---|---|
| XXXX | MBB | ISO-MBB |
| YYYY | Music | ISO-Music |
| ⋮ | ⋮ | ⋮ |

Fig.7

| SERVICE ID | CONTEXT | NSSAI |
|---|---|---|
| streaming | normal | MBB |
| streaming | isolated | ISO-MBB |

Fig. 8

INFORMATION NOTIFICATION METHOD AND MOBILE COMMUNICATION SYSTEM

TECHNICAL FIELD

An embodiment of the present invention relates to a method and a mobile communication system which are capable of notifying of information related to a slice which is a virtual network generated on a network infrastructure.

BACKGROUND ART

A network system using a conventional virtualization technique virtually cuts hardware resources using a virtualization technique disclosed in Non Patent Literature 1 and generates slices which are virtual networks which are logically generated on a network infrastructure. Then, a service is allocated to a corresponding slice, and thus a service can be provided using a network of each independent slice. Accordingly, in a case in which a slice is allocated to each service having various requirements, it is easy to satisfy requirements of each service, and it is possible to reduce signaling processing or the like.

CITATION LIST

Non Patent Literature

Non Patent Literature 1: Akihiro Nakao, "Virtual Node Project Virtualization Technology for Building New-Generation Networks," [online], June 2010, National Institute of Information and Communications Technology, [searched on Mar. 8, 2017], Internet <http://www.nict.go.jp/publication/NICT-News/1006/01.html>

SUMMARY OF INVENTION

Technical Problem

By the way, in a case in which a user desires to be provide with a service, it is necessary to cause a terminal to establishing a connection with a slice. However, even in a case in which it is desired to be provided with a service through a plurality of slices under control of a plurality of devices which are independent of each other, it takes time and effort for a terminal of a user to obtain information for establishing a connection with a plurality of slices in advance.

An embodiment of the present invention was made in light of the foregoing, and it is an object of the present invention to provide an information notification method capable of efficiently notifying of information for establishing a connection with a plurality of slices providing services.

Solution to Problem

In order to solve the above problem, an information notification method according to one aspect of the present invention is an information notification method executed by a device that controls a connection with a slice which is a virtual network generated on a network infrastructure, and includes a request reception step of receiving a request for a connection with the slice of a control target of the device from a terminal used by a user and a selection information transmission step of controlling, in response to the reception of the request, the connection of the terminal with the slice, acquiring selection information for selecting a slice of a control target of another device different from the device, and transmitting the selection information to the terminal.

Alternatively, a mobile communication system according to another aspect of the present invention is a mobile communication system that controls a connection with a slice which is a virtual network generated on a network infrastructure, and includes a request receiving unit that receives a request for a connection with the slice of a control target of a device from a terminal used by a user and a selection information transmitting unit that controls, in response to the reception of the request, the connection of the terminal with the slice, acquires selection information for selecting a slice of a control target of another device different from the device, and transmits the selection information to the terminal.

According to one aspect and another aspect described above, in a case in which a certain device receives a request for a connection with a slice which is under control of the device from a terminal, the connection with the slice is controlled, and the selection information for selecting the slice which is under control of another device different from the device is transmitted to the terminal. Accordingly, it is possible to efficiently notify the terminal of the information for selecting the slice allocated to the service. Accordingly, it is possible to facilitate provision of services by a plurality of slices which are under control of a plurality of devices which are independent of each other.

Advantageous Effects of Invention

According to the present invention, it is possible to efficiently notify of information for establishing a connection with a plurality of slices providing services.

DESCRIPTION OF EMBODIMENTS

An exemplary embodiment of the present invention will be described with reference to the appended drawings. The same parts are denoted by the same reference numerals wherever possible, and redundant description will be omitted.

Figure 1:
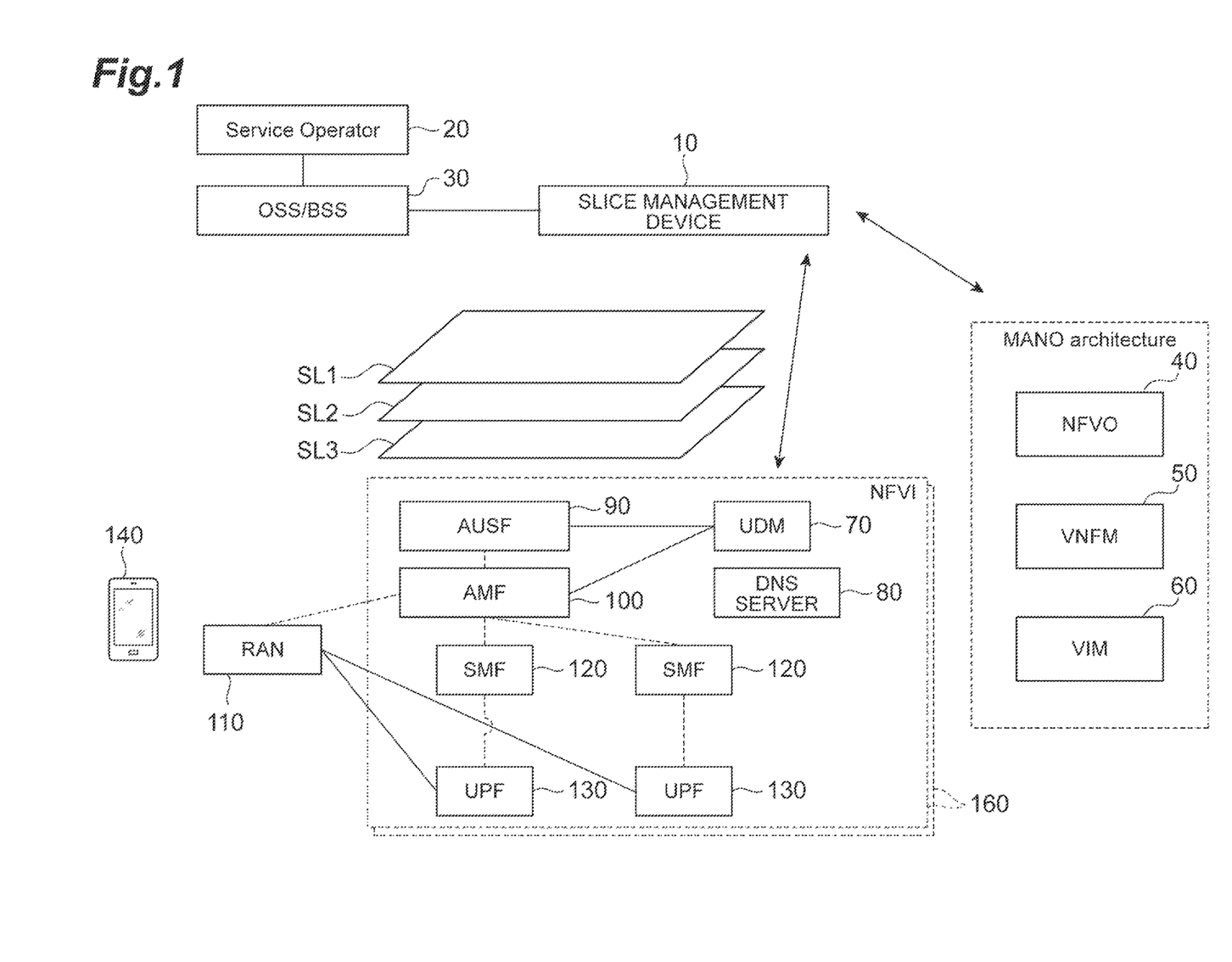
FIG. 1 is a diagram illustrating a system configuration of a mobile communication system according to an exemplary embodiment of the present invention.

FIG. 1 illustrates a configuration of a mobile communication system which implements an information notification method according to the present embodiment. The mobile communication system is a system that allocates a slice which is a virtual network to a service using a virtual network generated on a network infrastructure. The slice is a virtual network or a service network which is logically generated on a network infrastructure by virtually cutting link and node resources of a network device and coupling cut resources, and the slices do not interfere with each other since resources thereof are separated. The service is a service using network resources such as a communication service (a dedicated line service or the like) or an application service (video distribution or a service using a sensor device such as an embedded device).

As illustrated in FIG. 1, the mobile communication system includes a service operator (SO) 20, an operations support system/business support system (OSS/BSS) 30, a slice management device 10, an NFVO 40, a VNFM 50, a virtualized infrastructure management (VIM) 60, a unified data management (UDM) 70, a domain name system (DNS) server 80, an authentication server function (AUSF) 90, a core access and mobility management function (AMF) 100, a RAN 110, a session management function (SMF) 120, a user plane function (UPF) 130, and a user equipment (UE) 140. Among these components, the NFVO 40, the VNFM 50, and the VIM 60 are management & orchestration (MANO) architectures.

These components constitute a core network of the mobile communication system. Further, constituent elements between which it is necessary to exchange information are connected in a wired manner or the like and are able to perform transmission and reception of information.

The mobile communication system according to the present embodiment provides a communication function to a mobile communication terminal through a virtual server operating in a virtual machine realized on a physical server. In other words, the mobile communication system is a virtualized mobile communication network. The communication function is provided to the mobile communication terminal by executing a communication process corresponding to the communication function by the virtual machine.

The slice management device 10 is a node that performs service management (association between a slice and a service) in the mobile communication system and gives an instruction related to communication function in the mobile communication system. Further, the slice management device 10 can be operated by a carrier related to the mobile communication system.

The service operator (SO) 20 is a device that issues a service request, and is, for example, a terminal device (for example, a personal computer) of a service provider that provides a service to various users using a virtual network.

The OSS/BSS 30 is a device that receives the service request from the SO 20 and transmits information based on the request to the slice management device 10. The OSS/BSS 30 associates a service parameter (a service type which is service specifying information) identifying (specifying) a service which is a target of the service request with a slice specifying information (a slice ID) specifying a slice of an allocation destination of the service indicated by the service parameter, and transmits the associated information to the slice management device 10. Further, the OSS/BSS 30 may receive association information from the SO 20 and transmit the association information to the slice management device 10.

The NFVO 40 is an overall management node (functional entity) that manages the entire virtual network (slice) constructed on the NFVI 160 which is a physical resource. The NFVO 40 receives an instruction from a device that gives an instruction to generate a slice, and performs a process according to the instruction. The NFVO 40 performs management over the entire virtualized network constructed in the infrastructure and a physical resource of a mobile communication network of communication service. The NFVO 40 realizes a communication service provided by the virtual network at an appropriate location via the VNFM 50 and the VIM 60. For example, the NFVO 40 performs service life cycle management (specifically, for example, generation, update, scale control, and event collection) and resource distribution/reservation/allocation management of resources, service/instance management, and policy management (specifically, for example, reservation/allocation and optimal arrangement of resources based on geography, laws, or the like) over the entire mobile communication network.

The VNFM 50 is a virtual communication function management node (functional entity) that adds a function related to a service to the NFVI 160 serving as a physical resource (node). A plurality of VNFMs 50 may be installed in the system.

The VIM 60 is a physical resource management node (functional entity) that manages each physical resource (node). Specifically, the VIM 60 performs management of allocation/update/collection of resources, association of physical resources and virtual networks, and management of hardware resources and a SW resources (hypervisor) list. Usually, the VIM 60 manages each data center (building). The management of the physical resources is performed in a method corresponding to a data center. As a data center management method (a management resource implementation method), there are OPENSTACK, vCenter, and the like. Usually, the VIM 60 is installed for each data center management method. In other words, a plurality of VIMs 60 which manage respective physical resource in the NFVI 160 by different methods are included. Further, units of physical resources managed by different management methods need not necessarily be data center units.

The NFVO 40, the VNFM 50, and the VIM 60 are realized as a program is executed on a physical server device (here, it is not excluded that they are virtually realized, and management systems may be separated, and then they may be virtually realized). The NFVO 40, the VNFM 50, and the VIM 60 may be realized by separate physical server devices or may be realized by a single server device. (Programs for realizing) The NFVO 40, the VNFM 50, and the VIM 60 may be provided from different vendors.

Upon receiving the slice generation request, the NFVO 40 transmits a resource securing request for a slice (slices SL1, SL2, and the like) to the VIM 60. If the VIM 60 secures resources in a server device and a switch constituting a physical resource, the NFVO 40 defines slices for the physical resources.

Further, if the VIM 60 is caused to secure resources in the physical resources, the NFVO 40 stores the information defining the slices for the physical resources in a table stored in the NFVO 40. Then, the NFVO 40 transmits an installation request for software for realizing a function necessary for a corresponding service to the VNFM 50. In accordance with the installation request, the VNFM 50 installs the software in the physical resource (a node such as a server device, a switch device, or a router device) secured by the VIM 60.

If the software is installed by the VNFM 50, the NFVO 40 associates the slice and the service with the table stored in the NFVO 40. The slices SL1 to SL3 are slices serving as service allocation units.

The NFVI 160 which is the physical resource indicates a network formed from physical resources (a group of nodes) constituting the virtual environment. Conceptually, the physical resources include calculation resources, storage resources, and transmission resources. Specifically, the physical resources are configured to include nodes such as a physical server or a switch which is a physical server device performing a communication process in the system. The physical server is configured to include a CPU (a core or a processor), a memory, and a storage device such as a hard disk. Usually, a plurality of nodes such as the physical servers constituting the NFVI 160 are collectively arranged in a hub such as a data center (DC). In the data center, the arranged physical servers are connected by a network in the data center so that transmission and reception of information can be performed therebetween. Further, a plurality of data centers are installed in the system. The data centers are connected via a network, and the physical servers installed in different data centers can perform transmission and reception of information with each other via the network. Further, a plurality of NFVIs 160 which are physically independent may be installed in the system.

As described above, the VNFM 50 implements the functions of the UDM 70, the DNS server 80, the AUSF 90, the AMF 100, the SMF 120, and the UPF 130 by adding various types of functions to the NFVI 160 which is the physical resource (node). A plurality of SMFs 120 and a plurality of UPFs 130 are installed in the NFVI 160.

The UDM 70 is a function of managing subscriber information including contract information, authentication information, communication service information, terminal type information, and visited area information of a communication terminal such as the UE 140 in a database. Here, the communication service information is information defining a type of communication service used by each UE 140. The communication service information includes information identifying the UE 140 (for example, international mobile subscriber identity (IMSI)) and a service parameter indicating requirements of the communication service used by the UE 140.

The DNS server 80 is a function of managing a correspondence relation between a domain name or a host name and an IP address on a network. Further, the DNS server 80 stores information in which information (for example, a slice ID) identifying a slice is associated with an address of the SMF 120. Upon receiving an address transmission request from the AMF 100, the DNS server 80 transmits the address of the SMF 120 corresponding to the request to the AMF 100.

The AUSF 90 and the AMF 100 are communication devices which connects communication with the user terminal (UE 140) which visits a Long Term Evolution (LTE) network. The AUSF 90 is a function for performing authentication management of the UE 140. The AMF 100 is a function of performing location management of the UE 140 and a setting process of a communication path of user data between the UPF 130 and the UE 140.

Further, upon receiving a connection request (Registration Request) including a service parameter destined for a slice from the UE 140, the AMF 100 establishes a bearer which is a communication session between the UE 140 and the UPF 130 on the slice allocated to the service identified by the service parameter (the details will be described later).

The RAN 110 is a wireless base station connected to the AMF 100 and a device having a radio access control function.

The SMF 120 is a session management function for managing the bearer set between the UE 140 and the UPF 130. The UPF 130 is a function of a serving packet exchange accommodating LTE, and performs transmission and reception of the user data used for providing a communication service with the RAN 110. A plurality of UPFs 130 are installed corresponding to requirements of a plurality of communication services. A plurality of SMFs 120 are also provided, and each SMF 120 controls and manages a connection of a bearer in a plurality of UPFs 130 under its control. Further, the UPF 130 is a connection point with a packet data network (PDN) and is a gateway for transferring the user data or the like between the RAN 110 and the PDN.

The UE 140 is used by the user and is realized as a device having a communication function such as, for example, a mobile phone or a personal digital assistance (PDA). In a case in which a specific service is used, the UE 140 transmits a connection request (Registration Request) for establishing a connection to a slice allocated to a service to the RAN 110. The connection request may include service specifying information such as a service type identifying a service used by the UE 140. Further, the service specifying information such as the service type of each service to be used is stored in the UE 140 in advance, and it is possible to establish a connection with a desired slice allocated to a service to be used with reference to the service specifying information.

Figure 2:
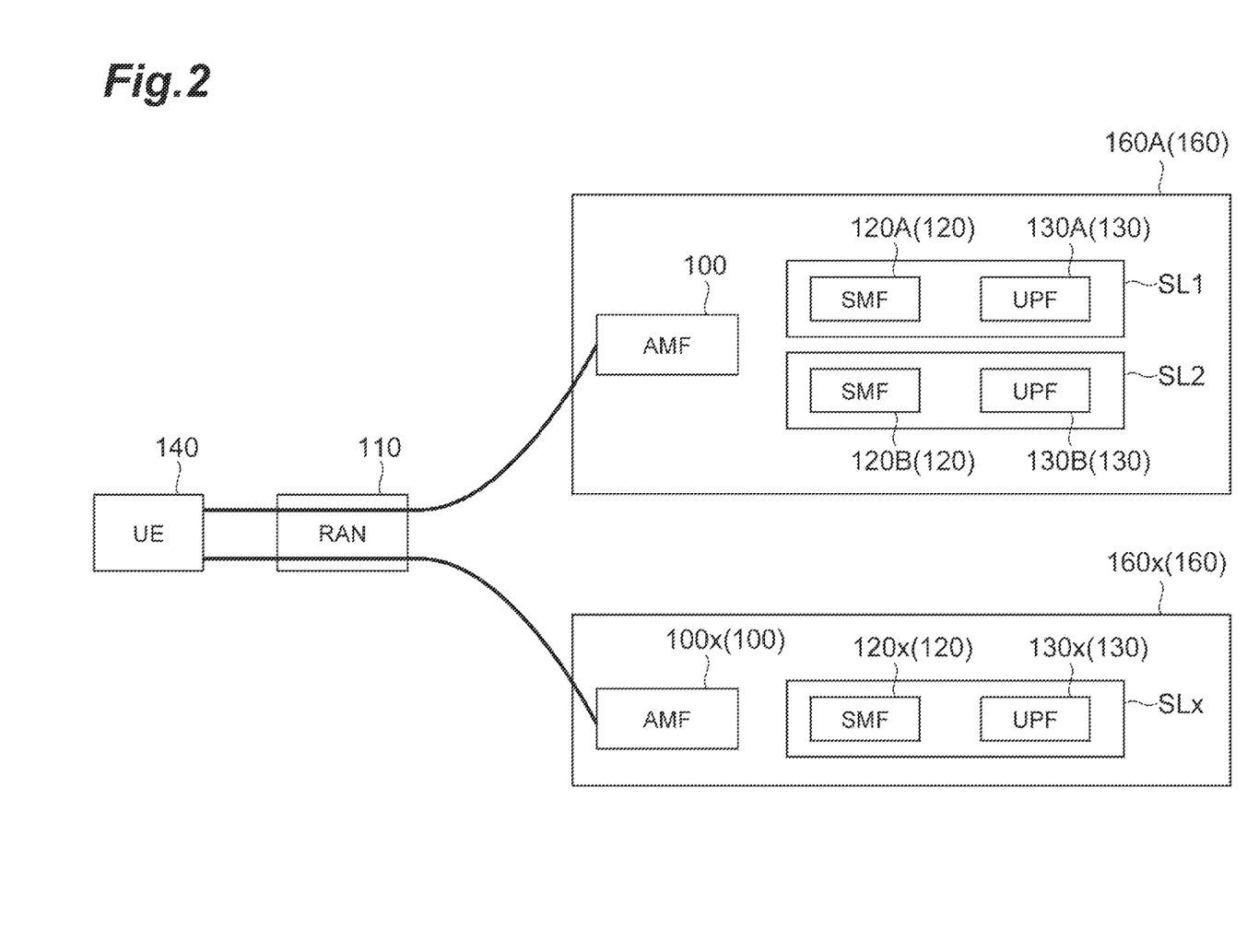
FIG. 2 is a diagram illustrating a connection state between a UE and a slice in FIG. 1.

As illustrated in FIG. 2, the NFVI 160 which is the physical resource may include a plurality of physically independent networks, and, for example, an NFVI 160A including an AMF 100, SMFs 120A and 120B, and UPFs 130A and 130B may be combined with an NFVI 160$x$ including an AMF 100$x$, an SMF 120$x$, and an UPF 130$x$. For example, the NFVI 160A is a network that provides a slice (shared slice) to be shared by a plurality of users, and the NFVI 160$x$ is a network that provides a slice (isolated slices) dedicated to a specific user. The two AMFs 100 and 100$x$ included in the two network NFVIs 160A and 160$x$ can be connected to a common RAN 110, the AMF 100 performs a bearer setting process in the slices SL1 and SL2 allocated in the NFVI 160A, and the AMF 100$x$ performs a bearer setting process in a slice SL$x$ allocated in the NFVI 160$x$. Here, the RAN 110 has a function of selecting the AMFs 100 and 100$x$ appropriate for the service used by the UE 140 in accordance with the connection request from the UE 140 and transferring the connection request to the selected AMF.

Hereinafter, a configuration of the AMF 100 will be described in detail. In addition to functions to be described below, the AMF 100 has a function to be described using sequence diagrams of FIGS. 6 and 8 to be described later.

Figure 3:
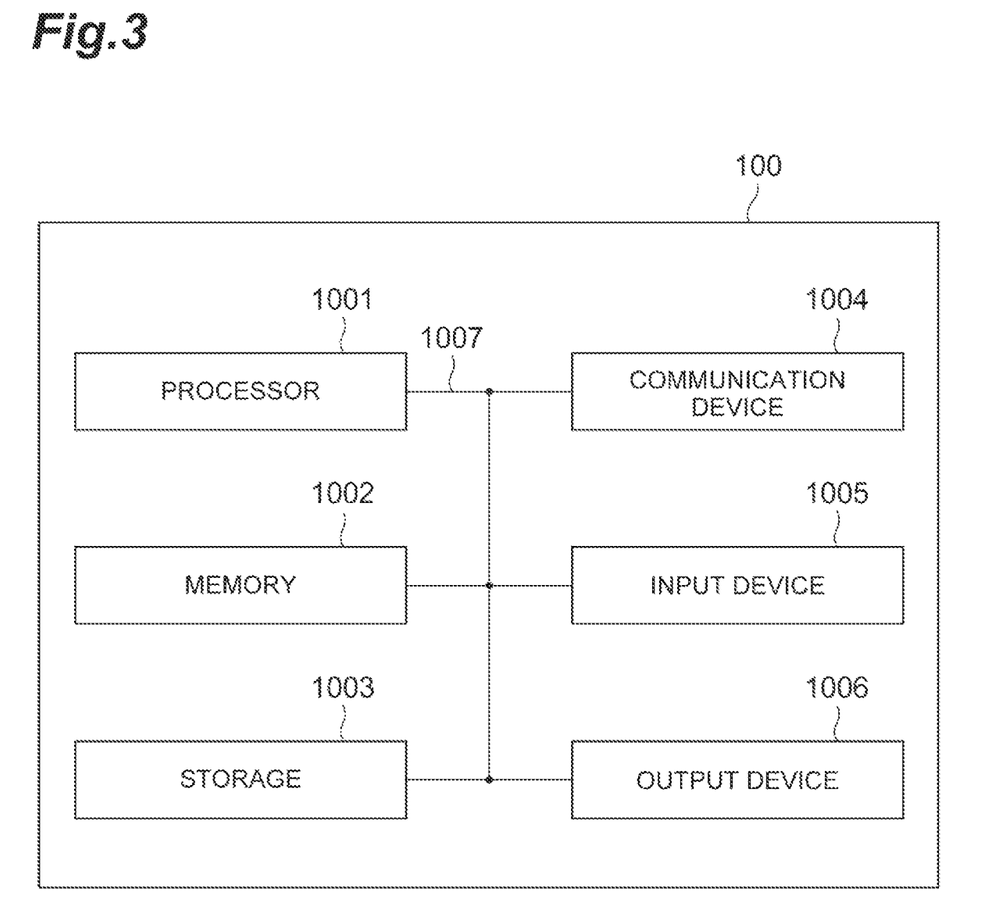
FIG. 3 is a block diagram illustrating an example of a hardware configuration of an AMF 100 in FIG. 1.
Figure 4:
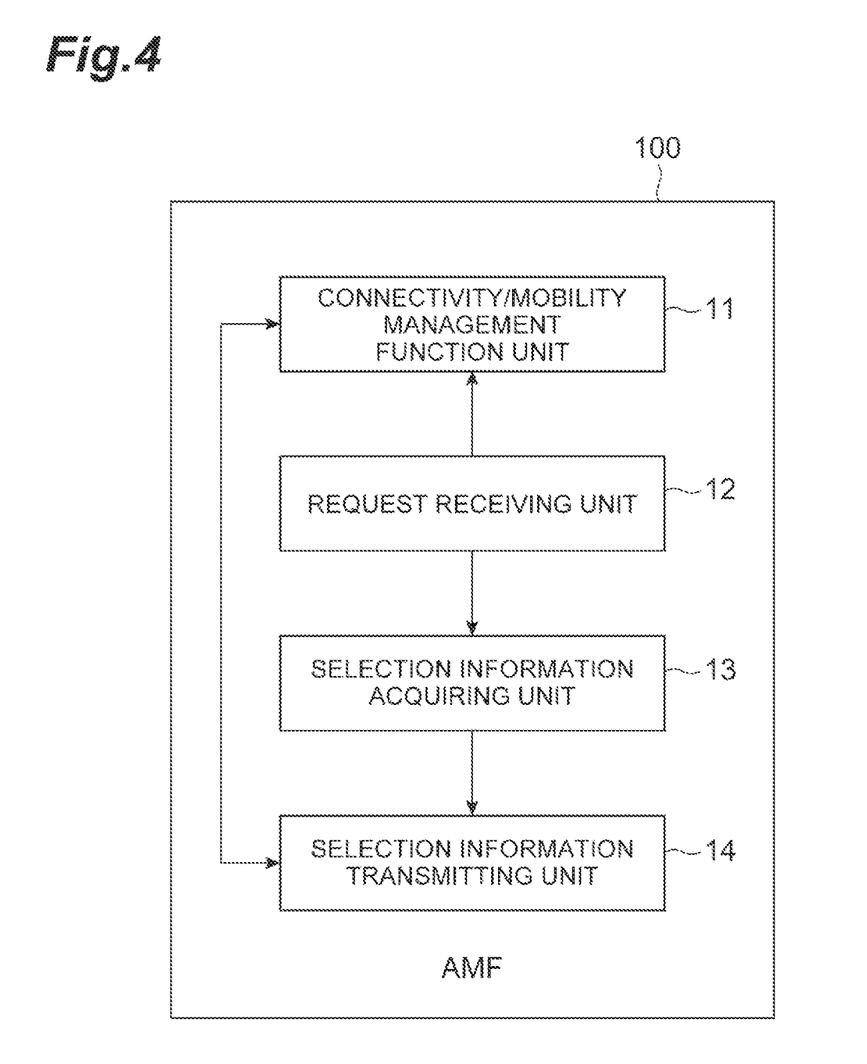
FIG. 4 is a block diagram illustrating a functional configuration of an AMF 100 in FIG. 1.

FIG. 3 illustrates a hardware configuration of the AMF 100, and FIG. 4 illustrates a functional configuration of the AMF 100. As illustrated in FIG. 4, the AMF 100 includes, as functional components, a connectivity/mobility management function unit 11, a request receiving unit 12, a selection information acquiring unit 13, and a selection information transmitting unit 14.

The block diagram illustrated in FIG. 4 illustrates blocks of functional units. The functional blocks (configuring units) are implemented by an arbitrary combination of hardware and/or software. A device implementing each functional block is not particularly limited. In other words, each functional block may be implemented by one device which is physically and/or logically combined or may be implemented by a plurality of devices, that is, two or more devices which are physically and/or logically separated and are directly and/or indirectly connected (for example, a wired and/or wireless manner).

For example, the AMF 100 in an embodiment of the present invention may function as a computer that performs the process of the AMF 100 of the present embodiment. FIG. 3 illustrates an example of a hardware configuration of the AMF 100 according to the present embodiment. The AMF 100 may be physically configured as a computer device including a processor 1001, a memory 1002, a storage 1003, a communication device 1004, an input device 1005, an output device 1006, and a bus 1007.

In the description of this specification, the term "device" can be read as a circuit, a device, a unit, or the like. The hardware configuration of the AMF 100 may be configured to include one or more devices illustrated in the drawing or may be configured without including some devices.

Each function in the AMF 100 is implemented such that predetermined software (program) is read on hardware such as the processor 1001 and/or the memory 1002, and the processor 1001 performs an operation and controls communication by the communication device 1004 and reading and/or writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like. For example, the connectivity/mobility management function unit 11, the request receiving unit 12, the selection information acquiring unit 13, and the selection information transmitting unit 14 may be realized by the processor 1001.

Further, the processor 1001 reads a program (a program code), a software module, or data from the storage 1003 and/or the communication device 1004 out to the memory 1002, and performs various types of processes according to them. A program causing a computer to execute at least some of the operations described in the above embodiment is used as the program. For example, the connectivity/mobility management function unit 11 may be implemented by a control program which is stored in the memory 1002 and operates on the processor 1001, or the other functional blocks may be similarly implemented. Various kinds of processes have been described as being performed by one processor 1001 but may be performed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 is also referred to as a "register," a "cache," a "main memory," or the like. The memory 1002 can store programs (program codes), software modules, or the like which are executable for carrying out various types of processes of mobile communication according to an embodiment of the present embodiment.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transceiving device) for performing communication between computers via a wired and/or wireless network and is also referred to as a "network device," a "network controller," a "network card," a "communication module," or the like. For example, the connectivity/mobility management function unit 11, the request receiving unit 12, the selection information acquiring unit 13, the selection information transmitting unit 14, and the like may be realized by the communication device 1004.

The input device 1005 is an input device that receives an input from the outside, and the output device 1006 is an output device that performs an output to the outside. The input device 1005 and the output device 1006 may be realized by a touch panel display in which both devices are integrated.

The respective devices such as the processor 1001 and the memory 1002 are connected via the bus 1007 to communicate information with each other. The bus 1007 may be configured with a single bus or may be configured with different buses between the devices.

Further, the AMF 100 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these pieces of hardware.

Next, a function of each functional unit of the AMF 100 will be described.

The connectivity/mobility management function unit 11 is a unit that performs position management of the UE 140 visiting the mobile communication system and a setting process of the communication path (bearer) of control data or user data between the UPF 130 and the UE 140. Specifically, the connectivity/mobility management function unit 11 sets the bearer between the UPF 130 and the UE 140 on the slice allocated to the service used by the UE 140 in accordance with the connection request received from the UE 140 by the request receiving unit 12. At this time, the slice in which bearer is set may be designated by the service type included in the connection request.

The request receiving unit 12 receives (accepts) the connection request for requesting a connection with the slice allocated to the service used by the UE 140 from the UE 140 via the RAN 110. At this time, the request receiving unit 12 may receive the connection request including the service type specifying the service used by the US 140 (for example, identification information such as network slice selection assistance information (NSSAI)). As the NSSAI included in the connection request, a single NSSAI (S-NSSAI) identifying the service provided by shared slices, an isolated single NSSAI (ISO-S-NSSAI) identifying the service provided by the dedicated slices (isolated slices), or the like can be used.

Upon receiving the connection request by the request receiving unit 12, the selection information acquiring unit 13 acquires the selection information related to the slice in the NFVI 160x different from the NFVI 160A to which the AMF 100 belongs in accordance with the connection request as the connection of the UE 140 with the slice is controlled in the connectivity/mobility management function unit 11. In other words, the selection information acquiring unit 13 acquires, from the UDM 70 managing the communication service information, the selection information related to the slice SLx which is a connection control target of another AMF 100x different from the AMF 100.

Figure 5:
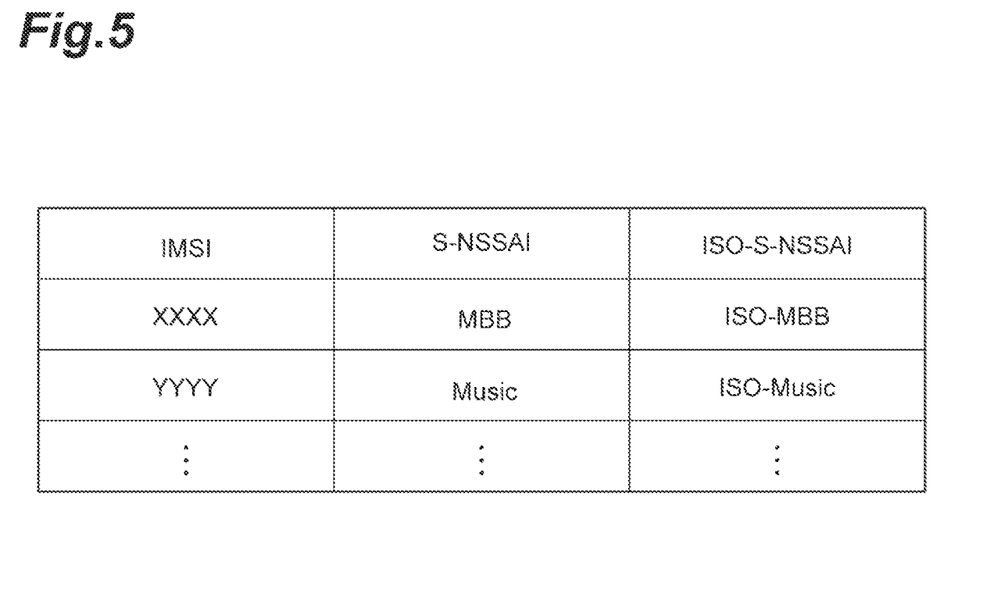
FIG. 5 is a diagram illustrating a data configuration of communication service information managed in a UDM 70 in FIG. 1.

FIG. 5 illustrates an example of a data configuration of the communication service information managed in the UDM 70 in the NFVI 160A. As illustrated in FIG. 5, in the communication service information, the information (S-NSSAI) specifying the service using the shared slice set in the NFVI 160A is associated with the information (ISO-S-NSSAI) specifying the service using the dedicated slice set in an external NFVI 160x for each piece of identification information (IMSI) identifying the UE 140. It means that the service specified by the S-NSSAI and the service specified by the ISO-S-NSSAI associated with the S-NSSAI are the same service. With reference to the communication service information having such a configuration, the selection information acquiring unit 13 acquires the specifying information (ISO-S-NSSAI) related to the slice in the NFVI 160x allocated to the same service as the slice in the NFVI 160A whose connection is controlled by the connectivity/mobility management function unit 11 as the selection information used when the slice is selected. For example, according to the example of FIG. 5, in a case in which the service corresponding to the slice of the connection destination of the UE 140 identified by IMSI "XXXX" is the service identified by the S-NSSAI "MBB," the ISO-S-NSSAI "ISO-MBB" associated with the S-NSSAI "MBB" is acquired as the selection information.

When the connection request is received by the request receiving unit 12, the selection information transmitting unit 14 transmits a connection reception (Registration Accept) destined for the UE 140 after the setting of the bearer is completed in the connectivity/mobility management function unit 11. At this time, the selection information transmitting unit 14 includes the selection information acquired by the selection information acquiring unit 13 in the connection reception and transmits the resulting connection reception to the UE 140.

Figure 6:
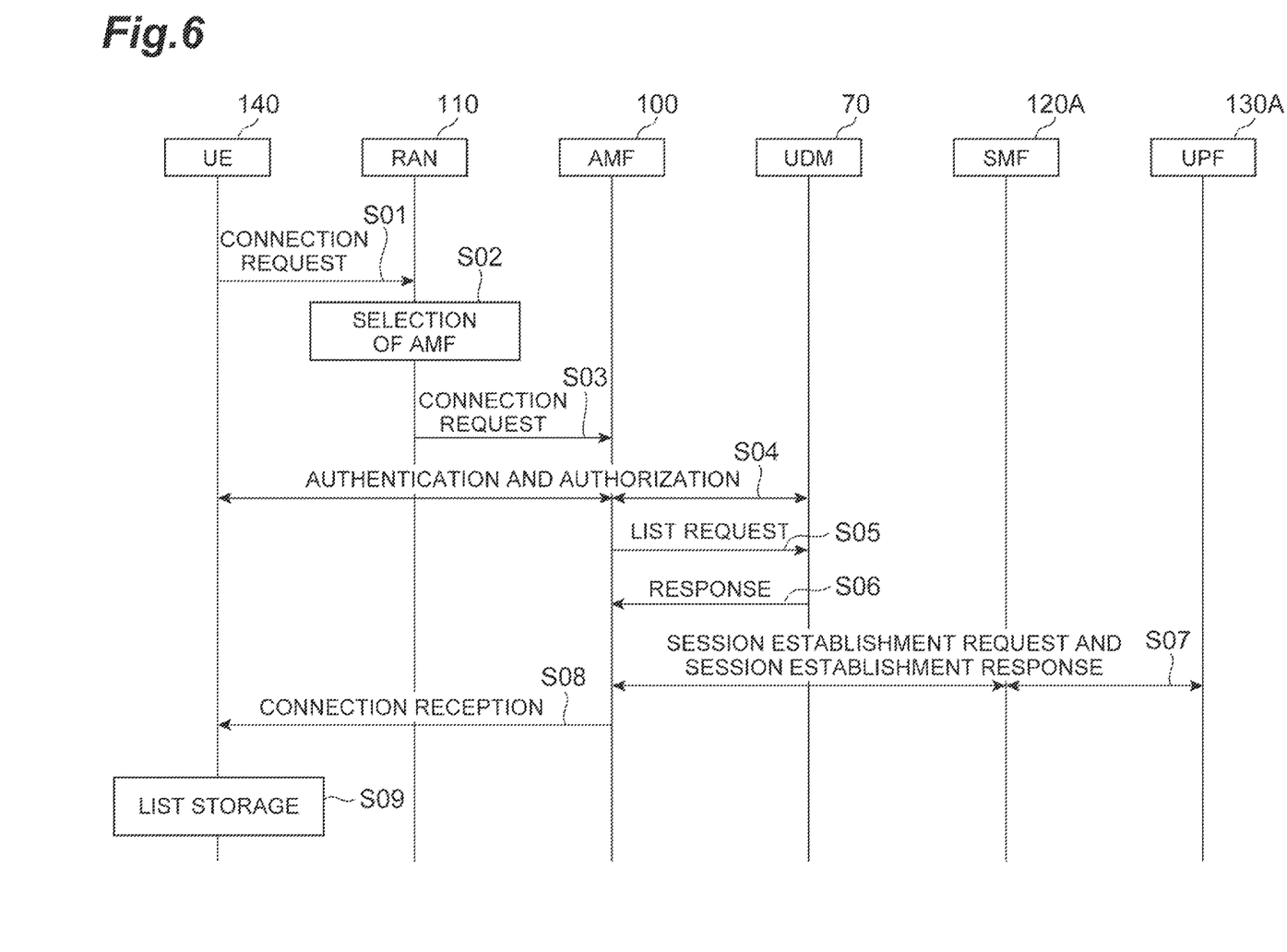
FIG. 6 is a sequence diagram illustrating a procedure of a setting process of a bearer on a shared slice by a mobile communication system of an embodiment.
Figure 7:
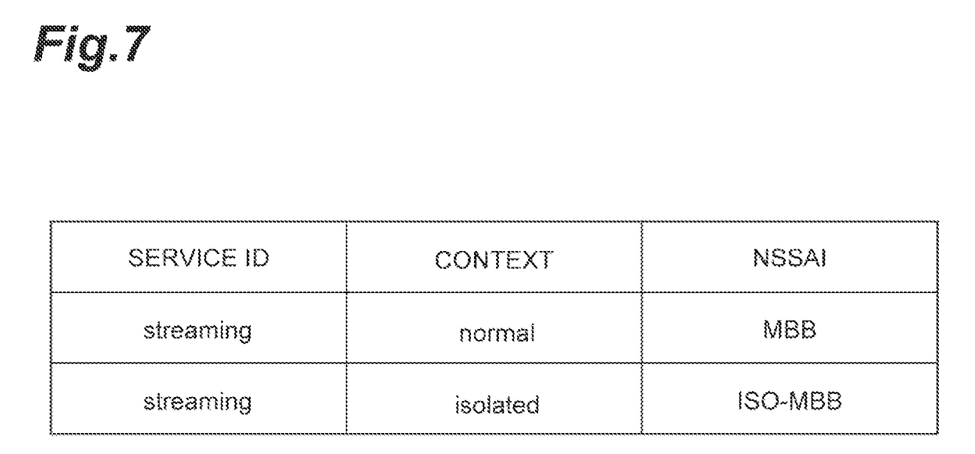
FIG. 7 is a diagram illustrating a data configuration of selection information held in a UE 140 in FIG. 1.
Figure 8:
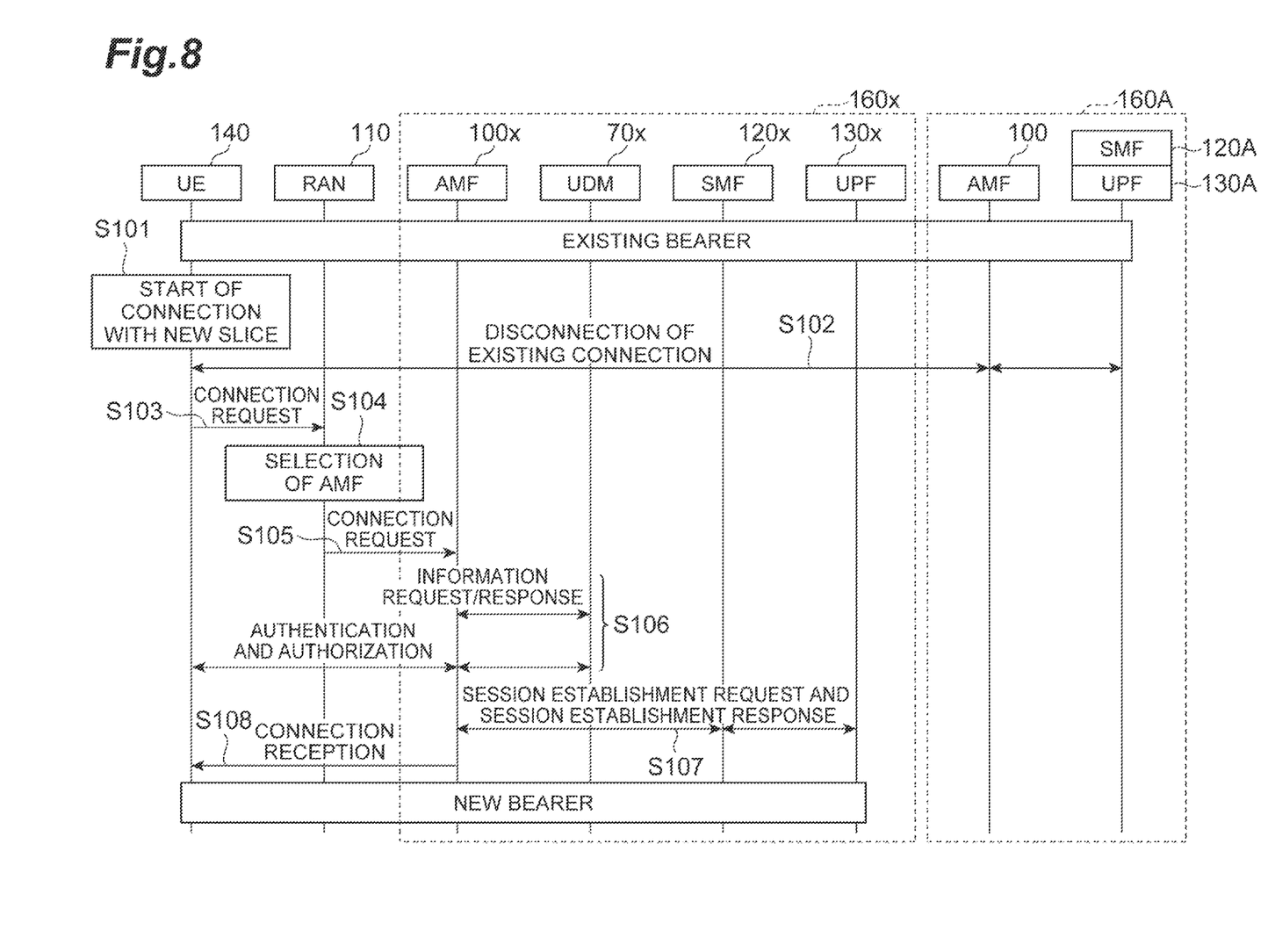
FIG. 8 is a sequence diagram illustrating a procedure of a setting process of a bearer on a dedicated slice by a mobile communication system of an embodiment.

Next, a procedure of the bearer setting process of the mobile communication system will be described, and an information notification method according to the present embodiment will be described in detail. FIG. 6 is a sequence diagram illustrating the procedure of the setting process of the bearer on the shared slice by the mobile communication system, FIG. 7 is a diagram illustrating a data configuration of the selection information held in the UE 140, and FIG. 8 is a sequence diagram illustrating the procedure of the setting process of the bearer on the dedicated slice by the mobile communication system.

First, the setting process of the bearer on the shared slice will be described with reference to FIG. 6. First, the connection request (Registration Request) is transmitted from the UE 140 to the RAN 110 in response to an operation by the user, movement of the UE 140 into the communication range, or the like (step S01). The connection request may include the service type (for example, the NSSAI) related to the service used by the UE 140. On the other hand, in the RAN 110, an appropriate AMF is selected in accordance with the service used by the UE 140 (step S02), and the connection request is transferred to the selected AMF 100 (step S03).

Then, the connectivity/mobility management function unit 11 of the AMF 100 executes the user authentication process (Authentication and Authorization) between the UE 140 and the UDM 70 in accordance with the connection request (step S04). Thereafter, the selection information acquiring unit 13 of the AMF 100 requests the UDM 70 to provides a list (NSSAI list) of service types (ISO-S-NSSAI) related to the dedicated slice associated with the shared slice of the connection destination of the UE 140 (step S05). In response to this, the selection information acquiring unit 13 acquires a list serving as the selection information from the UDM 70 (step S06).

Then, a bearer establishment request (PDU session establishment request) is transmitted from the connectivity/mobility management function unit 11 of the AMF 100 to the SMF 120A and the UPF 130A to which the slice of the connection destination of the UE 140 is allocated, and in response to this, the bearer connection process is performed in the SMF 120A and the UPF 130A, and then the bearer establishment response (PDU session establishment response) is transmitted to the AMF 100 (step S07). Thereafter, the connection reception (Registration Accept) including the selection information acquired by the selection information acquiring unit 13 is transmitted from the selection information transmitting unit 14 of the AMF 100 to the UE 140 (step S08). Finally, the UE 140 holds the acquired selection information as information to be used for establishing a future connection with a slice (step S09).

FIG. 7 illustrates an example of a data configuration of selection information held in the UE 140. As illustrated in FIG. 7, context "isolated" which is the information indicating the management state of the slice allocated to the service and the NSSAI "ISO-MBB" which is the information specifying the service in the mobile communication system are stored in association with the service ID "streaming" identifying the service used by the UE 140. In the example illustrated in FIG. 7, the NSSAI "MBB" related to the shared slice and the NSSAI "ISO-MBB" related to the dedicated slice are held as the selection information related to the slice allocated to the same service "streaming" With such selection information, the UE 140 can select an appropriate slice among a plurality of slices in accordance with a status of the terminal when the same service is used.

Next, the setting process of bearer on the dedicated slice after a connection with the shared slice is established will be described with reference to FIG. 8.

In a state in which the UE 140 is connected to the shared slice set in the NFVI 160A, the connection process to the dedicated slice set in the NFVI 160x is started in response to an operation of the user, detection of a status change in the UE 140, or the like (step S101). First, a bearer disconnection process between the UE 140 and the UPF 130A in the NFVI 160A is executed (step S102). Thereafter, the connection request (Registration Request) for the dedicated slice is transmitted from the UE 140 to the RAN 110 (step S103). The connection request includes the selection information related to the dedicated slice (ISO-S-NSSAI). The selection information is acquired from the information (FIG. 7) held in the UE 140. On the other hand, the RAN 110 selects the AMF 100x that controls the connection with the dedicated slice on the basis of the selection information (step S104), and transfers the connection request to the AMF 100x (step S105).

Next, in response with the connection request, the AMF 100x executes the user authentication process (Authentication and Authorization) between the UE 140 and the UDM 70x (step S106). Thereafter, the bearer establishment request (PDU session establishment request) is transmitted from the AMF 100x to the SMF 120x and the UPF 130x to which dedicated slice of the connection destination is allocated, and in response to this, the bearer connection process is performed in the SMF 120x and the UPF 130x, and then the bearer establishment response (PDU session establishment response) is transmitted to the AMF 100x (step S107). Thereafter, the connection reception (Registration Accept) notifying of the connection completion is transmitted from the AMF 100x to the UE 140 (step S108).

Next, operational effects of the mobile communication system and the information notification method of the present embodiment will be described. According to the mobile communication system described above, if the AMF 100 receives a request for a connection with a slice which is under the control of the AMF 100 from the UE 140, the connection with the slice is controlled, and the selection information for selecting the slice which is under the control of another AMF 100x different from the AMF 100 is transmitted to the UE 140. Accordingly, it is possible to efficiently notify the UE 140 of the information for selecting the slice allocated to the service. Accordingly, it is possible to facilitate provision of services by a plurality of slices which are under the control of a plurality of AMFs which are independent from each other.

Further, in the above embodiment, the selection information for selecting the slice allocated to the same service as the slice of the control target of the AMF 100 is acquired and transmitted. Accordingly, it is possible to efficiently notify the UE 140 of the information for selecting the slice allocated to the same service.

Further, in the above embodiment, the service identification information (NSSAI) identifying the service allocated to the slice is acquired and transmitted as the selection information. Accordingly, it is possible to efficiently notify of information for selecting a slice allocated to a desired service.

Although the present embodiment has been described in detail above, it will be apparent to those skilled in the art that the present embodiment is not limited to the embodiment described in this specification. The present embodiment can be implemented as revisions and modifications without departing from the spirit and scope of the present invention set forth in claims. Therefore, the description of this specification is for illustrative purposes only and does not have any restrictive meaning to the present embodiment.

A notification of information is not limited to the aspect or embodiment described in this specification and may be given by any other method. For example, the notification of information may be given physical layer signaling (for example, downlink control information (DCI), uplink control information (UCI)), upper layer signaling (for example, radio resource control (RRC) signaling, medium access control (MAC) signaling, broadcast information (master information block (MIB), system information block (SIB))), other signals, or a combination thereof. Further, the RRC signaling may be referred to as an "RRC message" and may be, for example, an RRC connection setup message, an RRC connection reconfiguration message, or the like.

Each aspect and embodiment described in this specification is applicable to Long Term Evolution (LTE), LTE-Advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), and systems using any other appropriate systems and/or next generation systems expanded on the basis of the systems.

The processing procedures, the sequences, the flowcharts, and the like of the respective aspects/embodiments described in this specification may be reversed in order unless there is a contradiction. For example, the method described in this specification presents elements of various steps in an exemplary order and is not limited to a presented specific order.

Information and the like can be output from the upper layer (or the lower layer) to the lower layer (or the upper layer). Information and the like may be input/output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination may be performed in accordance with a value (0 or 1) indicated by one bit, may be performed in accordance with a Boolean value (true or false), or may be performed by a comparison of numerical values (for example, a comparison with a predetermined value).

Each aspect/embodiment described in this specification may be used alone, may be used in combination, or may be switched in association with execution. Further, a notification of predetermined information (for example, a notification indicating "being X") is not limited to an explicit notification and may be performed by an implicit notification (for example, a notification of predetermined information is not given).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is referred to as software, firmware, middleware, a microcode, a hardware description language, or any other name.

Further, software, commands, and the like may be transmitted and received via a transmission medium. For example, when software is transmitted from a web site, a server, or any other remote source using a wired technology such as a coaxial cable, a fiber optic cable, a twisted pair, or a digital subscriber line (DSL) and/or a wireless technology such as infrared rays, a radio wave, or a microwave, the wired technology and/or the wireless technology are included in a definition of a transmission medium.

Information, signals, and the like described in this specification may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

The terms described in this specification and/or terms necessary for understanding this specification may be replaced with terms having the same or similar meanings.

Further, information, parameters, and the like described in this specification may be indicated by absolute values, may be indicated by relative values from predetermined values, or may be indicated by corresponding other information. For example, radio resources may be indicated by an index.

The names used for the parameters described above are not limited in such points.

The term "determining" used in this specification may include a wide variety of actions. For example, "determining" may include, for example, events in which events such as calculating, computing, processing, deriving, investigating, looking up (for example, looking up in a table, a database, or another data structure), or ascertaining are regarded as "determining" Further, "determining" may include, for example, events in which events such as receiving (for example, receiving information), transmitting (for example, transmitting information), input, output, or accessing (for example, accessing data in a memory) are regarded as "determining" Further, "determining" may include, for example, events in which events such as resolving, selecting, choosing, establishing, or comparing are regarded as "determining" In other words, "determining" may include events in which a certain operation is regarded as "determining."

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. When used in this specification, two elements may be considered to be "connected" or "coupled" with each other using one or more electric wires, cables and/or a printed electrical connection or using electromagnetic energy such as electromagnetic energy having a wavelength in a radio frequency domain, a microwave region, or a light (both visible and invisible) region as non-limiting and non-exhaustive examples.

A phrase "on the basis of" used in this specification is not limited to "on the basis of only" unless otherwise stated. In other words, a phrase "on the basis of" means both "on the basis of only" and "on the basis of at least."

"Include," "comprising," and variations thereof are intended to be comprehensive, similarly to a term "comprising" as long as the terms are used in this specification or claims set forth below. Furthermore, the term "or" used in this specification or claims set forth below is intended not to be an exclusive OR.

In this specification, a plurality of devices are also assumed to be included unless it clearly indicates only one device from the context or technically.

In the whole of the present disclosure, a plurality of things are assumed to be included unless it clearly indicates one thing from the context.

INDUSTRIAL APPLICABILITY

An embodiment of the present invention has a use purpose of a method and a mobile communication system which are capable of notifying information related to a slice which is a virtual network generated on a network infrastructure, and it is possible to efficiently notify of information for establishing a connection with a plurality of slices providing a service.

REFERENCE SIGNS LIST

100: AMF (device), 11: connectivity/mobility management function unit, 12: request receiving unit, 13: selection information acquiring unit, 14: selection information transmitting unit, 140: UE (terminal).

The invention claimed is:

1. An information notification method executed by a device that controls a connection with a first slice which is a virtual network generated on a network infrastructure, comprising:
   receiving a request for a connection with the first slice of a first control target of the device from a terminal used by a user; and
   controlling, in response to the reception of the request, the connection of the terminal with the first slice, acquiring selection information for selecting a second slice of a second control target of another device different from the device, and transmitting the selection information to the terminal,
   wherein the selection information is used by the terminal when requesting reconnecting with the first slice, to connect the terminal with the second slice other than the first slice.

2. The information notification method according to claim 1, wherein the selection information for selecting the second slice allocated to the same service as the first slice of the first control target of the device is acquired and transmitted.

3. The information notification method according to claim 1, wherein service identification information identifying the service allocated to the first slice is acquired and transmitted as the selection information.

4. The information notification method according to claim 2, wherein service identification information identifying the service allocated to the first slice is acquired and transmitted as the selection information.

5. The information notification method according to claim 1, wherein the selection information is used by the terminal, when requesting reconnecting with the first slice, to connect the terminal with the second slice instead of the first slice.

6. A mobile communication system including a device that controls a connection with a first slice which is a virtual network generated on a network infrastructure, comprising circuitry configured to:
   receive a request for a connection with the first slice of a first control target of the device from a terminal used by a user; and
   control, in response to the reception of the request, the connection of the terminal with the first slice, acquire selection information for selecting a second slice of a second control target of another device different from the device, and transmit the selection information to the terminal,
   wherein the selection information is used by the terminal when requesting reconnecting with the first slice, to connect the terminal with the second slice other than the first slice.

* * * * *